US007103350B2

(12) United States Patent
Au et al.

(10) Patent No.: US 7,103,350 B2
(45) Date of Patent: Sep. 5, 2006

(54) SCHEDULER WITH FAIRNESS CONTROL AND QUALITY OF SERVICE SUPPORT

(75) Inventors: Kelvin Kar-Kin Au, Ottawa (CA); Gamini Senarath, Nepean (CA); Yoon Chae Choong, Kanata (CA); Wei Huang, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 746 days.

(21) Appl. No.: 10/050,091

(22) Filed: Nov. 16, 2001

(65) Prior Publication Data

US 2003/0096597 A1    May 22, 2003

(51) Int. Cl.
*H04M 1/725* (2006.01)
(52) U.S. Cl. .............................. 455/412.2; 379/201.05; 370/395.21; 455/562.1
(58) Field of Classification Search ............. 455/412.1, 455/562.1; 370/395.21; 707/104.1
See application file for complete search history.

(56) References Cited

U.S. PATENT DOCUMENTS

| | | | | |
|---|---|---|---|---|
| 5,633,861 A | * | 5/1997 | Hanson et al. ............... | 370/232 |
| 6,343,298 B1 | * | 1/2002 | Savchenko et al. ......... | 707/104.1 |
| 6,591,382 B1 | * | 7/2003 | Molloy et al. ............... | 714/704 |
| 6,731,648 B1 | * | 5/2004 | Cotter ......................... | 370/458 |
| 6,801,791 B1 | * | 10/2004 | Buehrer et al. ............. | 455/562.1 |
| 6,813,272 B1 | * | 11/2004 | An et al. .................... | 370/395.21 |
| 6,865,185 B1 | * | 3/2005 | Patel et al. ................. | 370/412 |

FOREIGN PATENT DOCUMENTS

| | | |
|---|---|---|
| EP | 1 130 872 A1 | 9/2000 |
| WO | WO 01/63849 A2 | 8/2001 |
| WO | WO 01/63856 A1 | 8/2001 |
| WO | WO 01/71926 A2 | 9/2001 |

OTHER PUBLICATIONS

Bao, Gang, Oses, David Puig, and Holtzman, Jack, "Fairness Criteria for 1xEV-DV with More simulation Results," Qualcomm, Inc., Jan. 24, 2001.
Jalali, A., Padovani, R., and Pankaj, R., "Data Throughput of CDMA-HDR a High Efficiency-High Data Rate Personal Communication Wireless System," Proc. 2000 IEEE 51st Vehicular Technology Conference, May 15-18, 2000, Tokyo, Japan, pp. 1854-1858, ISBN 0-7803-5718-3.
Love, Robert, "Simulation Results with Regard to Fairness Criteria," Motorola, Inc., 2000.

* cited by examiner

*Primary Examiner*—Gerald Gauthier
(74) *Attorney, Agent, or Firm*—Withrow & Terranova, P.L.L.C.

(57) ABSTRACT

The present invention provides a scheduler capable of maximizing aggregate throughput while achieving controlled amount of fairness among users and meeting Quality of Service (QoS) requirements. The scheduler is configured to select the next unit of data to transmit from multiple queues associated with access terminals waiting to receive the data. For each access terminal, a weighting factor is calculated based on a temporal fading factor, a throughput fairness factor, and a delay QoS factor. The unit selected for transmission corresponds to the access terminal having the greatest overall weighting factor. The process repeats for each unit being transmitted.

33 Claims, 3 Drawing Sheets

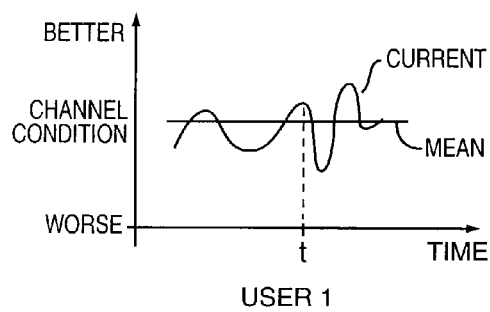
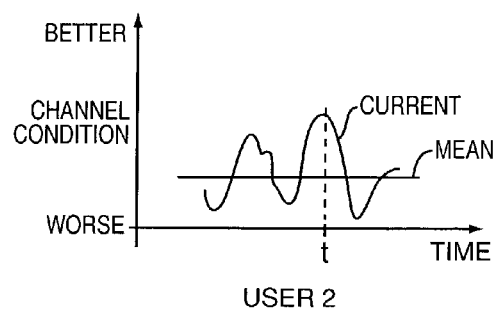
FIG. 3A
FIG. 3B
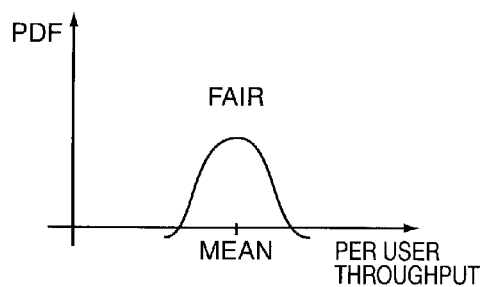
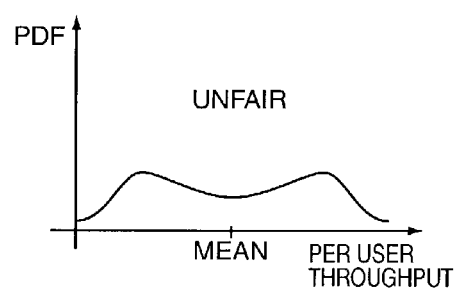
FIG. 4A
FIG. 4B
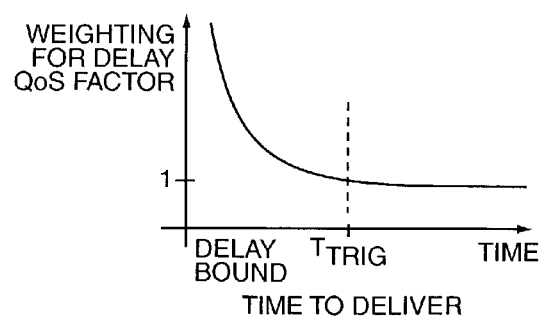
FIG. 5

SCHEDULER WITH FAIRNESS CONTROL AND QUALITY OF SERVICE SUPPORT

FIELD OF THE INVENTION

The present invention relates to wireless communications, and in particular to scheduling data for transmission from a base station to one or more mobile terminals.

BACKGROUND OF THE INVENTION

Wireless communication networks that allocate communication resources, such as time or frequency, require a scheduler to select data to be transmitted. When multiple users are vying for these resources, the scheduler must analyze the incoming data and determine the data having the highest priority for transmission. Priority has traditionally been based on maximizing overall system throughput or maintaining a certain Quality of Service (QoS) level to ensure data is transmitted in a timely fashion. When maximizing throughput, users having better channel conditions are favored over those with worse channel conditions. Thus, the users with the less favorable channel conditions are always given less priority unless time-sensitive data is discovered.

QoS analysis has been provided in existing systems but in a limited manner, for example, by processing only the section of the data that is ready for transmission or utilizing the buffer size. Normally, incoming data is buffered in queues corresponding to the user. If the QoS analysis only encompasses the section of data that is ready for transmission and not the entire queue, the remaining data in the queue does not affect priority. Thus, the scheduler cannot address urgent packets until they are ready for transmission, which results in QoS failures and inefficiencies. On the other hand, a large buffer size does not necessarily mean that all the packets in the buffer are urgent. These failures and inefficiencies typically further impact those users with less favorable channel conditions.

There have been some schemes to achieve a fixed level of fairness and maximize throughput. However, they lack: (a) the ability to control the fairness, including unfairness among users, (b) delay guarantee measures and (c) the ability to consider adequate information for data in the queue. Wireless network operators may want to control the amount of fairness in their systems. Given the inherent fixed level of fairness of the present schedulers, there is a need for a scheduler capable of maximizing the aggregate throughput, achieve the desired level of fairness among users and, at the same time, meet QoS requirements.

SUMMARY OF THE INVENTION

The present invention provides a scheduler capable of maximizing aggregate throughput while achieving a controlled amount of fairness among users and meeting Quality of Service (QoS) requirements. The scheduler is configured to select the next unit of data to transmit from multiple queues associated with access terminals waiting to receive the data. For each access terminal, a weighting factor is calculated based on a temporal fading factor, a throughput fairness factor, and a delay QoS factor. The unit selected for transmission corresponds to the access terminal having the greatest overall weighting factor. The process repeats for each unit being transmitted.

The temporal fading factor is a measure of an access terminal's current channel conditions relative to the access terminal's average channel conditions. Although channel condition measurement may be derived using any number of techniques, one embodiment of the present invention monitors channel conditions based on carrier-to-interference (C/I) ratios provided by the access terminal. The term "current channel condition" can be the C/I ratio obtained from the access terminal or a compensated C/I ratio based on any compensation techniques, such as prediction. The throughput fairness factor is a function of throughput capability for each access terminal. In an effort to achieve a desired minimum degree of fairness for all users, the throughput fairness factor increases the priority of access terminals with lower throughput capability and decreases the priority of access terminals with higher throughput capability. The throughput fairness factor may be a function of actual throughput, channel conditions, or a combination thereof.

The delay QoS factor is a function of delay bound for a unit or series of units. The delay bound typically defines the time in which a unit or series of units must be delivered. The function is suitably optimized to account for the packets' delay bounds and the amount of data to transmit. In operation, the units in each queue are analyzed and given a weight inversely proportional to the delay bound. The weights for the units in a given queue are summed to arrive at the delay QoS factor. The delay QoS factor may be further adjusted based on the amount of data to transmit. Preferably, all of the units in each queue are weighted when calculating the delay QoS factor. To reduce processing, units having a delay bound greater than a defined limit may be assigned a nominal weight.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIGS. 3A and 3B are graphs illustrating exemplary current-to-mean channel conditions for two users, respectively.

FIGS. 4A and 4B are graphs illustrating both fair and unfair user throughput characteristics.

FIG. 5 is a graph illustrating an exemplary weighting factor characteristic as a function of time.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
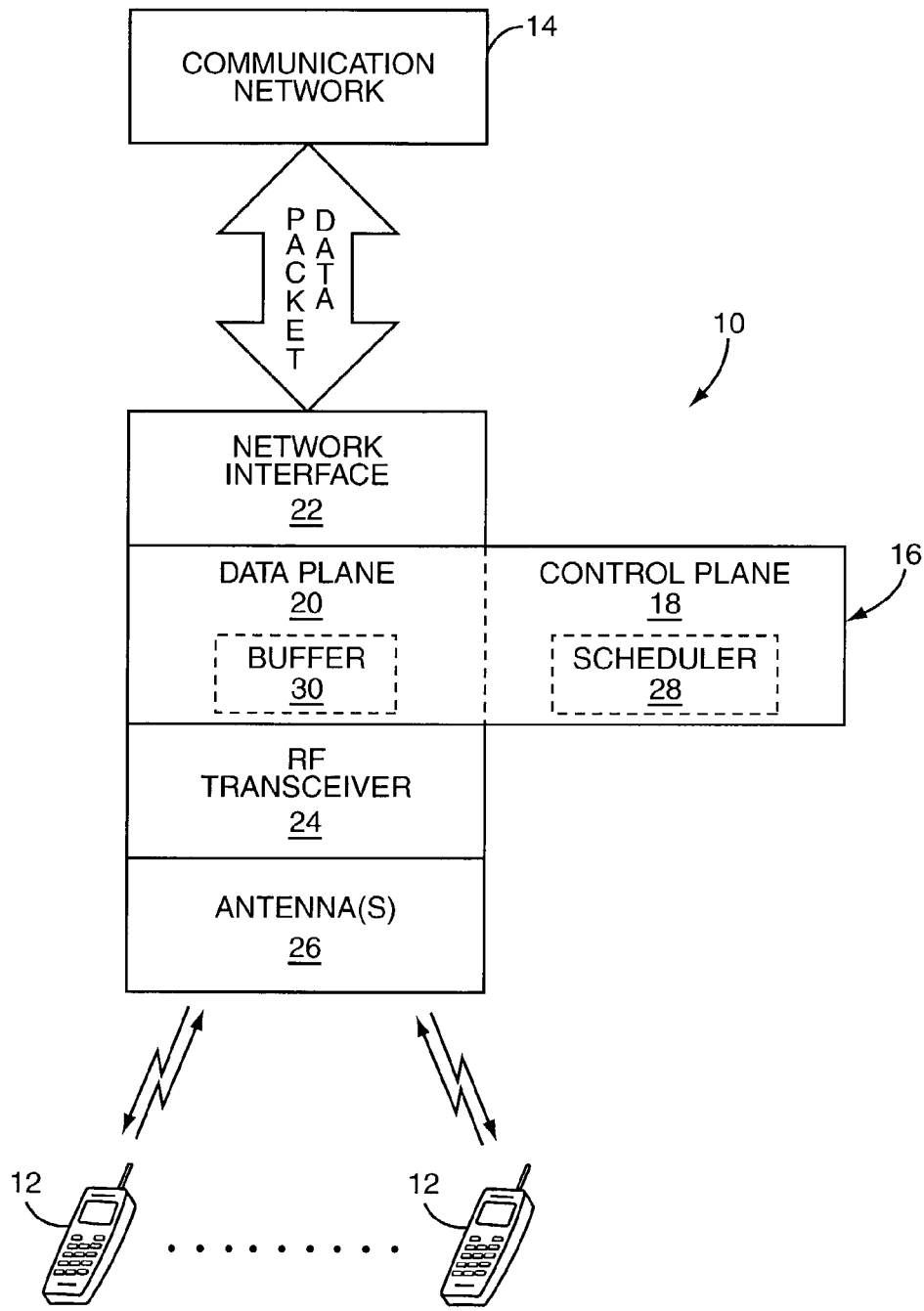
FIG. 1 is a block representation of a wireless communication environment according to one embodiment of the present invention.

Reference is now made to FIG. 1. Wireless networks use access points, such as base stations 10, to facilitate communications with access terminals, such as mobile terminals 12, within a select coverage area, or cell. Respective groups of base stations 10 are supported by a communication network 14, which may include mobile switching centers, a public switched telephone network (PSTN), a packet-switched network, or a combination thereof. The communication network 14 is used to transport packets to and from the base station 10. The packets may be communicated in a direct packet-switched manner or on top of a circuit-switched platform. The manner in which the packets are communicated to the base station 10 is not critical to the invention.

During downlink communications from the base station 10 to select mobile terminals 12, the base station 10 must determine the manner and order in which to transmit the data received in the packets from the communication network 14 to the mobile terminals 12. Accordingly, the base station 10 will include a control system 16 having control plane 18 controlling the flow of data through a data plane 20. For communicating with the mobile terminals 12, the data plane 20 will process packets received from the communication network 14 via a network interface 22 under the control of the control plane 18. The packets are processed into units, which are delivered to radio frequency (RF) transceiver circuitry 24 for transmission. For the sake of clarity, the term "packet" refers to packetized data, which is received by the base station 10 from the communication network 14. The term "unit" refers to packetized data that is transmitted from the base station 10 to the mobile terminals 12. A unit may include all or any part of one or more packets. Although units may directly correspond to packets, units are preferably a given size wherein packets may vary in size from one packet to another. The units may include voice or traditional data.

The forward link from the base station 10 to the mobile terminal 12 will include one or more channels, which are divided into defined time slots. The RF transceiver circuitry 24 is configured to modulate a given unit as dictated by the control plane 18 and transmit the modulated unit via one or more antennas 26 during a single time slot. The RF transceiver circuitry 24 is preferably configured to implement different modulation and coding techniques and speeds based on channel conditions, the capabilities of the mobile terminals 12, or required transmission standards. Those skilled in the art will recognize the various possible modulation techniques and that multiple units may be transmitted in a given time slot.

The control plane 18 includes a scheduler 28, which is configured to control delivery of units to the mobile terminals 12 based on channel conditions, required throughput fairness, and quality of service (QoS). During operation, packets for any number of mobile terminals 12 are received and stored in a buffer 30 associated with the data plane 20. The buffer 30 is segregated into multiple queues, each associated with a given mobile terminal 12. If the packets do not directly correspond to units, the incoming packets are processed into the desired units. The units are stored in the respective queues in the order in which they are received. Preferably, the queues use a first-in-first-out (FIFO) configuration.

Figure 2:
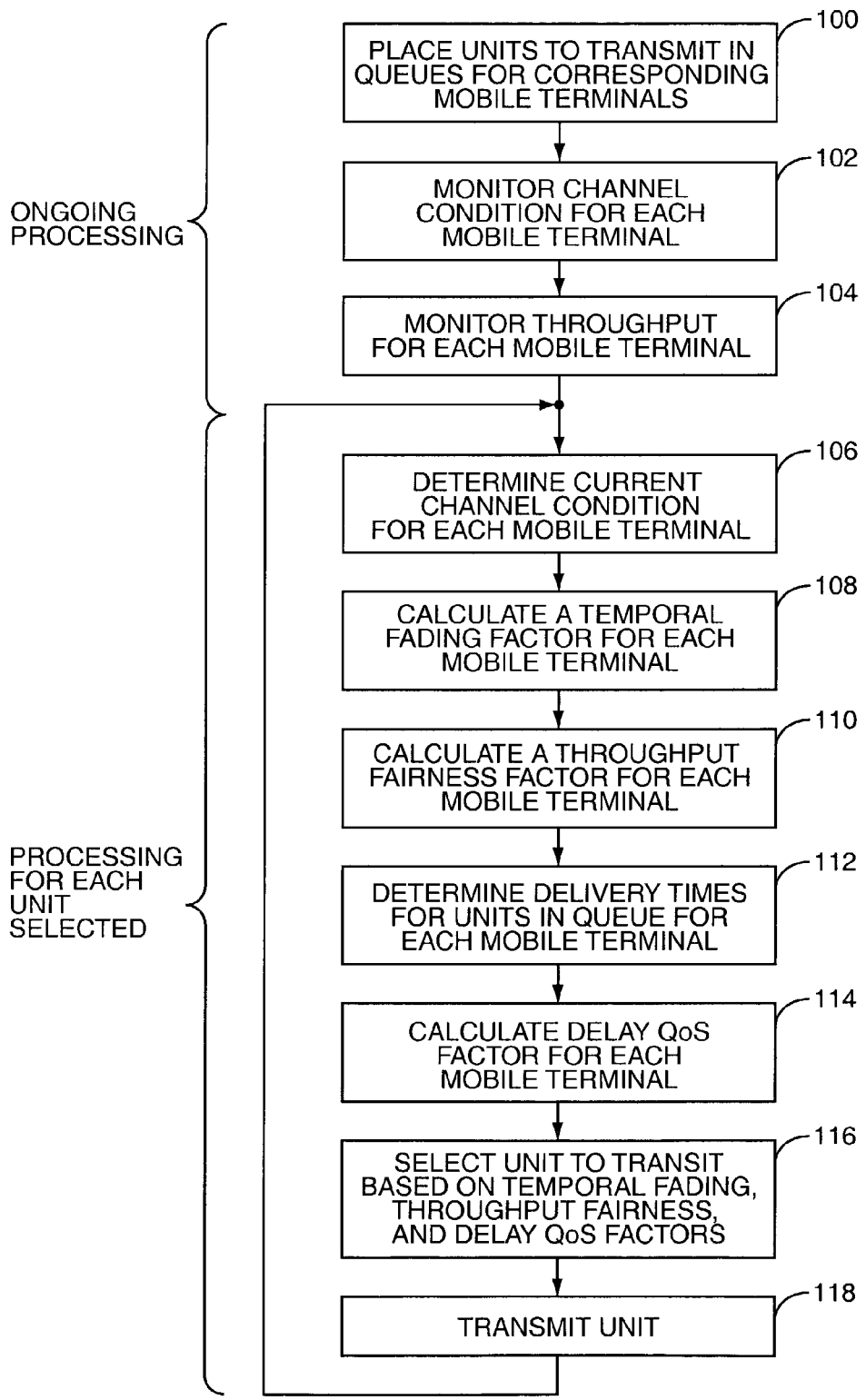
FIG. 2 is a flow diagram according to one embodiment of the present invention.

With reference to the flow diagram of FIG. 2, operation of the scheduler 28 is illustrated. On an ongoing basis, the units to transmit are placed in queues for the corresponding mobile terminals 12 (step 100). Further, the scheduler 28 will continuously monitor channel conditions and the throughput rates for each mobile terminal 12 (steps 102 and 104). A channel condition represents the quality of the transmission channel from the base station 10 to the mobile terminals 12. The throughput rates may be a function of actual data throughput, channel conditions, or a combination thereof.

Channel conditions may vary continuously and be determined using any number of techniques. For example, carrier to interference ratios (C/I), which represent a measure of signal power to interference power, may be fed back to the base station 10 from the mobile terminals 12. The scheduler 28 will preferably continuously track channel conditions and maintain an average channel condition over a select period of time as well as a current channel condition for each mobile terminal 12. Similarly, the scheduler 28 will preferably keep track of an average and current rate of data throughput for each of the mobile terminals 12.

The scheduler 28 continuously analyzes the units in each of the queues to determine the next unit to transmit. For each unit transmitted, the following processing occurs. The scheduler 28 will initially determine the current channel condition for each mobile terminal 12 being supported (step 106). From the current channel condition determination, a temporal fading factor is calculated for each mobile terminal (step 108). As noted, the C/I or like channel condition measurement may be used to determine the current channel condition. The temporal fading factor is preferably a measure of the current channel condition relative to an average channel condition for each mobile terminal 12.

The temporal fading factor increases for a mobile terminal 12 having the best current channel conditions relative to its own mean. Hence, each mobile terminal 12 will have a greater chance to receive units from the base station 10 than in a scenario where selections are biased toward mobile terminals 12 having the best current or average channel conditions. With reference to FIGS. 3A and 3B, the mobile terminal 12 of user 2 will have a greater temporal fading factor at time t than user 1, because the ratio between the current to the mean channel condition is higher for user 1 than user 2. Assigning mobile terminal 12 for user 2 a greater temporal fading factor helps to compensate for the historically lower channel conditions and the relatively high current channel condition with respect to the mobile terminal 12 of user 1. The temporal fading factor (T) may be implemented by:

$$T = \frac{\text{current } C/I}{\text{average } C/I}$$

or $$T = \text{current } C/I(\text{dB}) - \text{average } C/I(\text{dB}).$$

The average C/I is obtained over an averaging window, which is preferably approximately 20 fade duration. Fade duration is defined as $2f_d^{-1}$ where $f_d$ is the maximum Doppler frequency. For instance, in the nomadic case where $f_d$=five (5) Hz, the averaging window is two (2) seconds.

Next, the scheduler 28 will calculate a throughput fairness factor for each mobile terminal 12 (step 110). The throughput fairness factor determines the amount of priority to give to mobile terminals 12 in locations supporting higher throughput versus those in locations supporting lower throughput. Although networks are typically configured to maximize throughput and to err toward maximizing throughput by prioritizing those mobile terminals 12 capable of communicating at higher rates, all users deserve at least a minimum degree of fairness, even at the expense of capacity. The throughput fairness factor is used to control the throughput distribution among the mobile terminals 12. With reference to FIGS. 4A and 4B, a more fair distribution is illustrated in FIG. 4A while a seemingly unfair distribution is illustrated in FIG. 4B. The scheduler 28 will generate a higher throughput fairness factor to allow those mobile terminals 12 with less favorable channel conditions to achieve a desired mean throughput.

The throughput fairness factor (F) may be implemented by $F_i=R_i^f$, where $R_i$ is the average throughput capability of mobile terminal i (12) and f controls the desired fairness. Preferably, the average throughput capability is obtained from average channel conditions and not just on the throughput rate during transmission to a given mobile terminal 12. Accordingly, $R_i$ is a function of channel conditions for each user i in one embodiment. Those skilled in the art will recognize that actual and average data throughput may be used to supplement determination of the fairness factor. In the present example, changing the parameter f provides various levels of fairness. For instance, when f is greater than zero, the throughput fairness factor F is larger for higher rate users and allows more unfairness. In contrast, when f is less than zero, the throughput fairness factor F is smaller for higher rate users and allows more fairness.

The scheduler 28 will next determine the requisite delivery time for the units in each of the queues associated with the mobile terminals 12 (step 112). Delay bounds relate to the time in which a unit (or packet) must be delivered to ensure a defined Quality of Service and may be used to determine expiry times. A delay bound is typically associated with a packet, which may be broken into one or more units. By analyzing all or a significant number of units in each queue, the scheduler 28 can make weighting decisions based on the urgency of delivery for packets deeper in the queue, even when the next unit to transmit in the queue does not have an impending delay bound.

After determining the expiry times for the queued units, the scheduler 28 will calculate a delay QoS factor (D) for each mobile terminal 12 (step 114). The delay QoS factor (D) for each mobile terminal 12 is preferably based on all of the units in the queue for the mobile terminal 12. In the example provided, each packet in each queue is given a weight corresponding to the inverse of the delivery time, which is the expiry time less the current time. A unit that is closer to its expiry time is given a larger weight than a unit further from its expiry time. To reduce computational load on the scheduler 28, units with a delivery time (expiry time−current time) greater than a given threshold or trigger, $T_{TRIG}$, may be assigned a normalized weight. Based on the weighting for each unit in the queue, a delay QoS factor (D) is calculated for the units at the head of each queue. Although various weighting criteria may be used, the following describes a weighting function for one embodiment of the present invention.

As illustrated in FIG. 5, the present embodiment assigns a normalized weight for units having a remaining delivery time greater that $T_{TRIG}$. This delay QoS factor is calculated for each user at the beginning of each time slot by a weighted sum of all packets in the queue for all QoS levels. The weighted QoS factor for the i-th user is given by:

$$D_i(n) = \sum_{j=1-\text{all units in queue}} \frac{T_{TRIG} * \text{Amount of data(unit or packet)}}{(\text{deliver time}(j) - \text{current time})}$$

for(deliver time(j) − current time) < $T_{TRIG}$

The delay QoS factor (D) is a function of the amount of data and the requisite time to deliver as defined by the delay bounds. Therefore, the delay QoS factor (D) increases with increasing traffic and urgency of the units. Moreover, the delay QoS factor (D) can be large if there is a large amount of units far from the delay bound. Accordingly, the scheduler 28 can give priority to users with large amounts of data ahead of time.

Each unit in the queue is given a weight, which is inversely proportional to the remaining delivery time. A unit that is close to the expiry time has a larger weight than a unit that has plenty of time before it meets the delay bound. Only units that have a remaining delivery time greater than zero are counted. Further, the amount of data or size of a packet represented by one or more units will also impact the delay QoS factor (D). If the remaining delivery time for a unit is greater than $T_{TRIG}$, a normalized weighting is applied and D is simply the sum of all the packets. In essence, the parameter $T_{TRIG}$ determines when the proportional weighting is applied to a given unit.

The scheduler 28 will then select the next unit to transmit based on the temporal fading factor (T), the throughput fairness factor (F), and the delay QoS factor (D) for the units at the head of each queue (step 116). One way of combining the three factors is to define a priority weighting index (P) based on the product of the three:

$$P=n(T_i)^x(F_i)^y(D_i)^z,$$

where $T_i$ is the temporal fading factor, $F_i$ is the throughput fairness factor, $D_i$ is the delay QoS factor for the ith user, x, y, z are powers suitably chosen and n is a normalization constant. Accordingly, the product of the three factors is calculated for the units at the front of each queue. The unit with the greatest weighting factor is selected for delivery. Once selected, the unit at the front of the queue having the greatest weighting is modulated and transmitted during the next time slot by the RF transceiver circuitry 24 (step 118). The continuous process repeats for each available time slot.

Those skilled in the art will recognize improvements and modifications to the preferred embodiments of the present invention. All such improvements and modifications are considered within the scope of the concepts disclosed herein and the claims that follow.

What is claimed is:

1. An access point for scheduling delivery of units of data to a plurality of access terminals comprising:
   a) a network interface for receiving data from a communication network;
   b) a wireless interface for transmitting units of the data to a plurality of access terminals; and
   c) a control system having a plurality of queues corresponding to the plurality of access terminals and adapted to:
      i) store the data received over the communication network as units in the plurality of queues for the plurality of access terminals;
      ii) determine a temporal fading factor based on a current channel condition relative to an average channel condition for each of the plurality of access terminals;
      iii) determine a throughput fairness factor based on throughput capability for each of the plurality of access terminals;
      iv) determine a delay Quality of Service (QoS) factor based on delivery times associated with at least one unit for each of the plurality of access terminals;

v) calculate a weighting factor based on the temporal fading factor, the throughput fairness factor, and the delay QoS factor for each of the plurality of access terminals; and
vi) select a unit for transmission via the wireless interface from one of the plurality of queues based on the weighting factor.

2. The access point of claim 1 wherein the control system is further adapted to:
a) determine the average channel condition over a period;
b) determine the current channel condition; and
c) calculate a ratio of the current channel condition to the average channel condition to determine the temporal fading factor.

3. The access point of claim 1 wherein the current and average channel conditions are derived from carrier-to-interference ratios.

4. The access point of claim 1 wherein the throughput fairness factor is calculated in a manner deemed to achieve a select level of fairness between access terminals having better channel conditions and access terminals having worse channel conditions.

5. The access point of claim 1 wherein the throughput fairness factor is a function of the average channel condition.

6. The access point of claim 1 wherein the throughput fairness factor is a function of an average throughput rate.

7. The access point of claim 6 wherein the throughput fairness factor is a further function of the average channel condition.

8. The access point of claim 1 wherein the delay QoS factor for each of the plurality of access terminals is a function of the delivery times for a plurality of the units in each of the plurality of queues including the next unit to transmit in each queue.

9. The access point of claim 8 wherein the delay QoS factor for each of the plurality of access terminals is a function of an amount of data to be transmitted.

10. The access point of claim 1 wherein the control system is further adapted to:
a) calculate a weight inversely proportional to the delivery times for a plurality of the units in each of the plurality of queues; and
b) calculate the delay QoS factors for each of the plurality of access terminals by summing the weights for the plurality of the units in each of the plurality of queues.

11. The access point of claim 10 wherein the control system is further configured to assign a defined weight for units having a delivery time greater than a defined threshold.

12. A method of scheduling transmission of units of data buffered in queues corresponding to a plurality of access terminals, the method comprising:
a) determining a temporal fading factor based on a current channel condition relative to an average channel condition for each of the plurality of access terminals;
b) determining a throughput fairness factor based on throughput capability for each of the plurality of access terminals;
c) determining a delay Quality of Service (QoS) factor based on delivery times associated with at least one unit for each of the plurality of access terminals;
d) calculating a weighting factor based on the temporal fading factor, the throughput fairness factor, and the delay QoS factor for each of the plurality of access terminals; and
e) selecting a unit for transmission via a wireless interface from one of the queues based on the weighting factor.

13. The method of claim 12 further comprising:
a) determining the average channel condition over a period;
b) determining the current channel condition; and
c) calculating a ratio of the current channel condition to the average channel condition to determine the temporal fading factor.

14. The method of claim 12 wherein the current and average channel conditions are derived from carrier-to-interference ratios.

15. The method of claim 12 wherein the throughput fairness factor is calculated in a manner deemed to achieve a select level of fairness between access terminals having better channel conditions and access terminals having worse channel conditions.

16. The method of claim 12 wherein the throughput fairness factor is a function of the average channel condition.

17. The method of claim 12 wherein the throughput fairness factor is a function of an average throughput rate.

18. The method of claim 17 wherein the throughput fairness factor is a further function of the average channel condition.

19. The method of claim 12 wherein the delay QoS factor for each of the plurality of access terminals is a function of the delivery times for a plurality of the units in each queue including the next unit to transmit in each queue.

20. The method of claim 19 wherein the delay QoS factor for each of the plurality of access terminals is a function of an amount of data to be transmitted.

21. The method of claim 12 further comprising:
a) calculating a weight inversely proportional to the delivery times for a plurality of the units in each of the queues; and
b) calculating the delay QoS factors for each the of the plurality of access terminals by summing weights for the plurality of the units in each of the queues.

22. The method of claim 21 further comprising assigning a defined weight for units having a delivery time greater than a defined threshold.

23. A computer readable medium having software for scheduling transmission of units of data buffered in queues corresponding to a plurality of access terminals, the software comprising instructions to:
a) determine a temporal fading factor based on a current channel condition relative to an average channel condition for each of the plurality of access terminals;
b) determine a throughput fairness factor based on throughput capability for each of the plurality of access terminals;
c) determine a delay Quality of Service (QoS) factor based on delivery times associated with at least one unit for each of the plurality of access terminals;
d) calculate a weighting factor based on the temporal fading factor, the throughput fairness factor, and the delay QoS factor for each of the plurality of access terminals; and
e) select a unit for transmission via a wireless interface from one of the queues based on a weighting factor.

24. The computer readable medium of claim 23 further comprising instructions to:
a) determine the average channel condition over a period;
b) determine the current channel condition; and
c) calculate a ratio of the current channel condition to the average channel condition to determine the temporal fading factor.

25. The computer readable medium of claim 23 wherein the current and average channel conditions are derived from carrier-to-interference ratios.

26. The computer readable medium of claim 23 wherein the throughput fairness factor is calculated in a manner deemed to achieve a select level of fairness between access terminals having better channel conditions and access terminals having worse channel conditions.

27. The computer readable medium of claim 23 wherein the throughput fairness factor is a function of the average channel condition.

28. The computer readable medium of claim 23 wherein the throughput fairness factor is a function of an average throughput rate.

29. The computer readable medium of claim 28 wherein the throughput fairness factor is a further function of the average channel condition.

30. The computer readable medium of claim 28 wherein the delay QoS factor for each access terminal is a function of the delivery times for a plurality of the units in each queue including the next unit to transmit in each queue.

31. The computer readable medium of claim 30 wherein the delay QoS factor for each access terminal is a function of an amount of data to be transmitted.

32. The computer readable medium of claim 28 further comprising instructions to:
   a) calculate weight inversely proportional to the delivery times for a plurality of the units in each of the queues; and
   b) calculate the delay QoS factors for each access terminal by summing the weights for the plurality of the units in each of the queues.

33. The computer readable medium of claim 28 further comprising instructions to assign a defined weight for units having a delivery time greater than a defined threshold.

* * * * *

UNITED STATES PATENT AND TRADEMARK OFFICE
CERTIFICATE OF CORRECTION

PATENT NO. : 7,103,350 B2  Page 1 of 1
APPLICATION NO. : 10/050091
DATED : September 5, 2006
INVENTOR(S) : Kelvin Kar-Kin Au et al.

It is certified that error appears in the above-identified patent and that said Letters Patent is hereby corrected as shown below:

On the Title Page, Item (75)
Please change the third inventor's name from "Yoon Chae Choong" to --Yoon Chae Cheong--.

Signed and Sealed this

Seventh Day of August, 2007

JON W. DUDAS
*Director of the United States Patent and Trademark Office*